United States Patent
Stenta

(10) Patent No.: US 6,700,255 B1
(45) Date of Patent: Mar. 2, 2004

(54) BEARING SYSTEM WITH FLEXIBLE BEARING BRACKET

(75) Inventor: Christopher Scott Stenta, North East, MD (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 18 days.

(21) Appl. No.: 09/703,425

(22) Filed: Nov. 1, 2000

Related U.S. Application Data

(60) Provisional application No. 60/165,247, filed on Nov. 12, 1999.

(51) Int. Cl.⁷ ................................................. H02K 5/16
(52) U.S. Cl. .......................... 310/90; 310/43; 384/192; 384/536
(58) Field of Search ............................. 310/90, 66, 42, 310/43; 384/103, 104, 119, 124, 192, 196, 199, 200, 495, 535, 536, 558, 581, 582

(56) References Cited

U.S. PATENT DOCUMENTS

| | | | |
|---|---|---|---|
| 1,220,991 A | 3/1917 | McGinley | 310/90 |
| 2,295,139 A | 9/1942 | Topanelian, Jr. | 308/26 |
| 2,448,500 A | 8/1948 | Turner | 308/72 |

(List continued on next page.)

FOREIGN PATENT DOCUMENTS

| | | |
|---|---|---|
| DE | 306441 | 4/1920 |
| DE | 399089 | 7/1924 |
| DE | 955526 | 6/1956 |
| DE | 2342747 | 3/1975 |
| DE | 3707600 | 9/1988 |
| EP | 0558269 | 9/1993 |
| EP | 0829943 | 3/1998 |
| FR | 2545664 | 11/1984 |
| JP | 54-123647 | 9/1979 |
| JP | 62132960 | 6/1987 |
| JP | 07217573 | 8/1995 |
| JP | 09236128 | 9/1997 |
| WO | WO 87/07097 | 11/1987 |

OTHER PUBLICATIONS

U.S. patent application Ser. No. 09/350,351, Stenta, filed Jul. 14, 1999.

PCT International Search Report, dated Oct. 25, 2000.

PCT International Search Report, dated Feb. 28, 2001, For Pct US/00/30210.

Merriam Webster's Collegiate Dictionary, Tenth Edition, pp. 890–891.*

*Primary Examiner*—Dang Le

(57) ABSTRACT

A bearing system that includes a bearing 50 supported in a flexible bearing bracket, for example for use in fractional horsepower shaded pole type electric motors. The bearing system is self aligning, the bracket being able to deflect to compensate for deviations in the radial alignment of the rotor shaft. A rotation lock restrains the bearing against rotation within the bracket. In the preferred embodiment the bracket is composed of an elastomer and the bearing is composed of a high performance plastic polymer, so that the bearing system is non-lubricating.

3 Claims, 5 Drawing Sheets

U.S. PATENT DOCUMENTS

| | | | | |
|---|---|---|---|---|
| 3,294,458 A | * 12/1966 | Mishima | ...................... | 308/184 |
| 3,897,983 A | 8/1975 | Hindle | ...................... | 308/26 |
| 3,909,087 A | 9/1975 | Cairns | ...................... | 308/268 |
| 4,014,596 A | 3/1977 | Kazama | ...................... | 308/72 |
| 4,111,499 A | 9/1978 | McCloskey | ...................... | 308/72 |
| 4,357,552 A | 11/1982 | MacMillan | ...................... | 310/90 |
| 4,368,931 A | 1/1983 | Casler et al. | ...................... | 384/192 |
| 4,532,054 A | 7/1985 | Johnson | ...................... | 252/12.4 |
| 4,623,810 A | 11/1986 | Smith | ...................... | 310/90 |
| 4,714,450 A | 12/1987 | Byrnes et al. | ...................... | 464/90 |
| 4,726,694 A | 2/1988 | McFarlin et al. | ...................... | 384/119 |
| 4,737,673 A | 4/1988 | Wrobel | ...................... | 310/90 |
| 4,783,608 A | 11/1988 | Gruber et al. | ...................... | 310/90 |
| 4,862,582 A | * 9/1989 | Henck | ...................... | 29/596 |
| 4,887,331 A | 12/1989 | Thomas | ...................... | 16/2 |
| 5,040,906 A | 8/1991 | Zornes | ...................... | 384/551 |
| 5,145,265 A | 9/1992 | Flem | ...................... | 384/296 |
| 5,236,784 A | 8/1993 | Kobayashi et al. | ...................... | 428/408 |
| 5,258,672 A | 11/1993 | Wrobel | ...................... | 310/42 |
| 5,287,030 A | 2/1994 | Nutter | ...................... | 310/89 |
| 5,497,039 A | 3/1996 | Blaettner et al. | ...................... | 310/51 |
| 5,509,738 A | 4/1996 | Haynes et al. | ...................... | 384/275 |
| 5,577,843 A | 11/1996 | Leininger et al. | ...................... | 384/275 |
| 5,577,847 A | 11/1996 | Nakamura et al. | ...................... | 384/517 |
| 5,707,718 A | 1/1998 | Matsukawa et al. | ...................... | 428/218 |
| 5,811,902 A | 9/1998 | Sato | ...................... | 310/90 |
| 5,866,647 A | 2/1999 | Massey et al. | ...................... | 524/494 |
| 5,887,982 A | 3/1999 | Wilcher | ...................... | 384/97 |
| 5,917,258 A | 6/1999 | Kershaw et al. | ...................... | 310/51 |
| 5,945,756 A | 8/1999 | Periyathamby et al. | ...................... | 310/89 |

* cited by examiner

BEARING SYSTEM WITH FLEXIBLE BEARING BRACKET

This application claims the benefit of U.S. Provisional Application No. 60/165,247, filed Nov. 12, 1999.

FIELD OF THE INVENTION

This invention relates to bearings. In particular, this invention relates to a bearing system and a flexible bearing bracket therefor.

BACKGROUND OF THE INVENTION

Small fractional horsepower "shaded pole" type motors are used in many applications, for example to provide air circulation in refrigeration systems. As is well known, shaded pole electric induction motors have a rotor comprising a rotor body bearing a shaft in rotationally fixed relation to the body. The rotor body is rotationally disposed within an opening in a magnetic stator assembly typically formed from a stack of aligned annular stator laminations. Electric field windings surrounding a portion of the stator magnetize the stator laminations to provide the required magnetic motive force for driving the rotor. In an air circulation system an impeller is mounted on the rotor shaft to drive the air flow.

In a conventional shaded pole motor the rotor shaft extends through a housing comprising brackets extending over each end of the rotor opening and secured, usually bolted, to the stator. The housing restrains the rotor body against substantial axial and radial displacement relative to the stator, and supports bearings which maintain the axial and radial alignment of the rotor shaft. The bearings thus maintain stability and alignment of the rotor while allowing for substantially free rotation of the rotor shaft. One example of such a motor is described in U.S. Pat. No. 5,287,030 issued Feb. 15, 1994 to Nutter, which is incorporated herein by reference.

Such fractional horsepower motors are particularly suitable for applications in which the motor runs for extended intervals over a prolonged period, which may be many years. As such the motor must be extremely durable, highly resistant to failure and preferably requires little maintenance over its useful life. The components which tend to be most problematic in achieving these parameters are the bearings, which are subject to persistent frictional contact with the rotating shaft over the life of the motor.

To maintain proper alignment of the rotor shaft, shaded pole type motors typically utilize spherical diameter, oil impregnated powdered metal bearings or ball bearings held in place by die cast aluminum or zinc bearing brackets. These types of bearings require constant exposure to a lubricant, which substantially limits the life of the motor. This problem is particularly acute in high temperature environments in which the oil used to lubricate the bearings dissipates over time, eventually causing catastrophic failure of the bearing system.

It is also known to press fit plastic or non-metallic journal bearings tightly to the bearing brackets. However, this type of bearing system requires machining after the press fitting operation, which significantly increases the manufacturing cost of the motor. Moreover, although a press fit journal bearing will remain in place in the bearing bracket during assembly, due to the interference fit between the bearing and the housing, the performance of the motor at times may be less than optimum because the fixed position of the bearing does not allow for even slight deviations in rotor shaft alignment. If the motor is jarred or bumped during operation, severe vibration and squealing can result because the bearing does not dampen the resulting vibrations due to disturbance of the shaft/bearing rotation.

These problems are particularly acute in the case of metal bearings supported by metal brackets, and precision machining of these components is therefore critical. There are also bearing systems which use a plastic bracket to support a metal bearing tightly fitted to the bracket in an interference fit. The system described in U.S. Pat. No. 5,287,030 uses a plastic bearing press fitted to a plastic bracket. However, in all of these systems the bracket is rigid, so that precise bearing alignment and adequate lubrication of the bearing remain critical to the proper operation of the motor, and the inability of the bearing to self align during operation reduces the useful life of the motor and generally causes the motor to operate less efficiently over time.

It is also known to use a plastic bearing press fitted into a metal bracket, but as the bearing is mounted the bracket closes the bearing inside diameter by the extent of the interference fit, which then necessitates precision machining of the inside diameter to restore adequate clearance for the rotor shaft. Also, the press fit operation causes the bearing to lose alignment during installation.

SUMMARY OF THE INVENTION

The present invention provides a bearing system comprising a bearing supported in a flexible bearing bracket, for example for use in fractional horsepower shaded pole type electric motors. In the preferred embodiment the bearing is insert molded into the bracket to produce a hybrid bracket/bearing assembly, which facilitates both the manufacture of the bearing system and assembly of the bearings to the motor.

In the preferred embodiment the bearing bracket is insert molded around a bearing, which ensures that the bearing is properly supported and will not misalign during assembly to the motor. The bearing system of the invention is self aligning due to the flexibility of the bearing bracket, which thus compensates for deviations in the radial alignment of the rotor shaft to maintain the optimum efficiency of the motor and reduce wear on the bearing, extending the life of the bearing system. In addition, the preferred embodiment employs a resilient elastomeric bearing bracket while efficiently damping vibrations which may be induced in the system.

In the preferred embodiment both the bracket and bearing are composed of a non-metallic material. The bearing may be composed of a high performance plastic which does not require lubrication, to prolong the life of the motor. Other aspects of the invention may be implemented in a bearing system that utilizes metal bearings.

In the preferred embodiment of the invention a flanged or bushing type bearing is provided with an opening having a bearing surface complimentary to the rotor shaft. A bearing bracket is molded around most of the flange and the hub of the bearing, creating a bearing receptacle that holds the bearing securely, with extremely close tolerances between the receptacle and the bearing. Preferably a rotation lock, for example flats distributed about the hub of the bearing, restrains the bearing against rotation within the bracket.

Because the elastomeric bracket is flexible, the bearing settles into the proper alignment with the rotor shaft by deflection of the bracket itself. In effect, the bracket serves the functions of both supporting the bearing and compensating for bearing misalignment, so that the bearing is able to adjust to accommodate deviations in the axial pitch of the rotor shaft, increasing the life of the bearing system.

In one embodiment the bearing bracket is molded with ribbed securing posts and/or complimentary sockets into which the securing posts are secured. This aspect of the invention simplifies assembly of the bearing brackets to the motor.

The present invention thus provides a bearing system for use with a motor (10) having a rotor shaft (16) and a rotor (16) rotating within an opening through a stator (20), comprising a bearing bracket (32) comprising a receptacle (40) surrounding a bearing (50) and supporting the bearing (50) in fixed relation to the bracket (32), wherein the bracket (32) is adapted to be mounted on the motor (10) such that the opening (56) in the bearing (50) is disposed in the vicinity of an axis of the rotor shaft (16), and wherein the bracket is sufficiently flexible that the rotor shaft (16) can deflect the bracket (32) so that the bearing 50 moves into alignment with an axis of the rotating shaft (16) but the bracket (32) is sufficiently rigid that the rotor (12) is maintained in spaced relation from the stator (20) during operation of the motor (10).

The present invention further provides motor (10) having a rotor shaft (16) and a rotor (16) rotating within an opening through a stator (20), having a bearing system comprising one or more bearings (50) each comprising an opening (56) having at least one bearing surface (58), for maintaining a radial alignment of the rotor shaft (16), and one or more bearing brackets (32) each comprising a receptacle (40) surrounding the bearing (50) and supporting the bearing (50) in fixed relation, wherein the brackets (32) are adapted to be mounted on the motor (10) such that the openings (56) in the bearings (50) are disposed on opposite ends of the stator (20) in the vicinity of an axis of the rotor shaft (16), and wherein the brackets are sufficiently flexible that the rotor shaft (16) can deflect the brackets (32) so that the bearings 50 move into alignment with an axis of the rotating shaft (16) but the brackets (32) are sufficiently rigid that the rotor (12) is maintained in spaced relation from the stator (20) during operation of the motor (10).

BRIEF DESCRIPTION OF THE DRAWINGS

In drawings which illustrate by way of example only preferred embodiments of the invention.

DETAILED DESCRIPTION OF THE INVENTION

Figure 1:
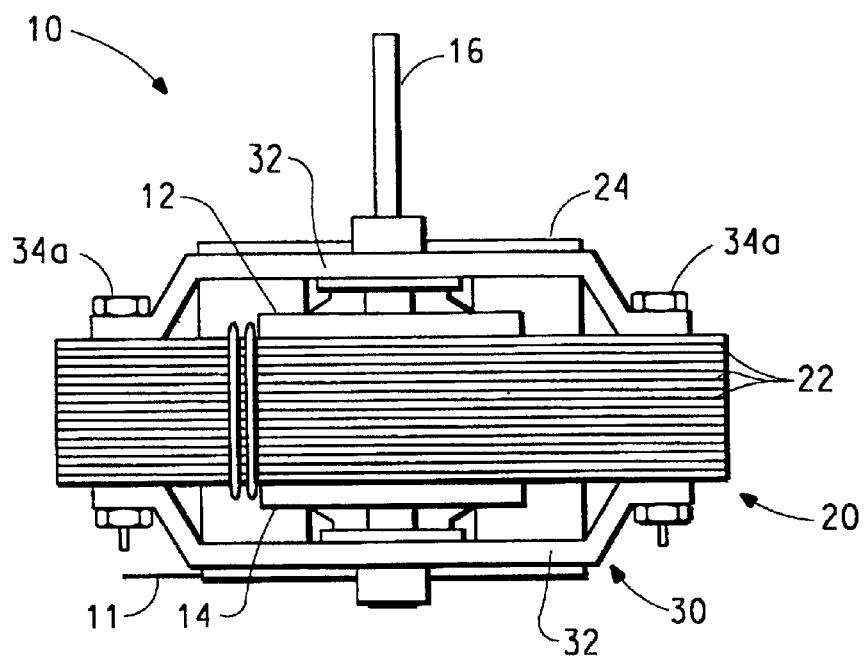
FIG. 1 is a front elevation of a motor embodying the invention.
Figure 2:
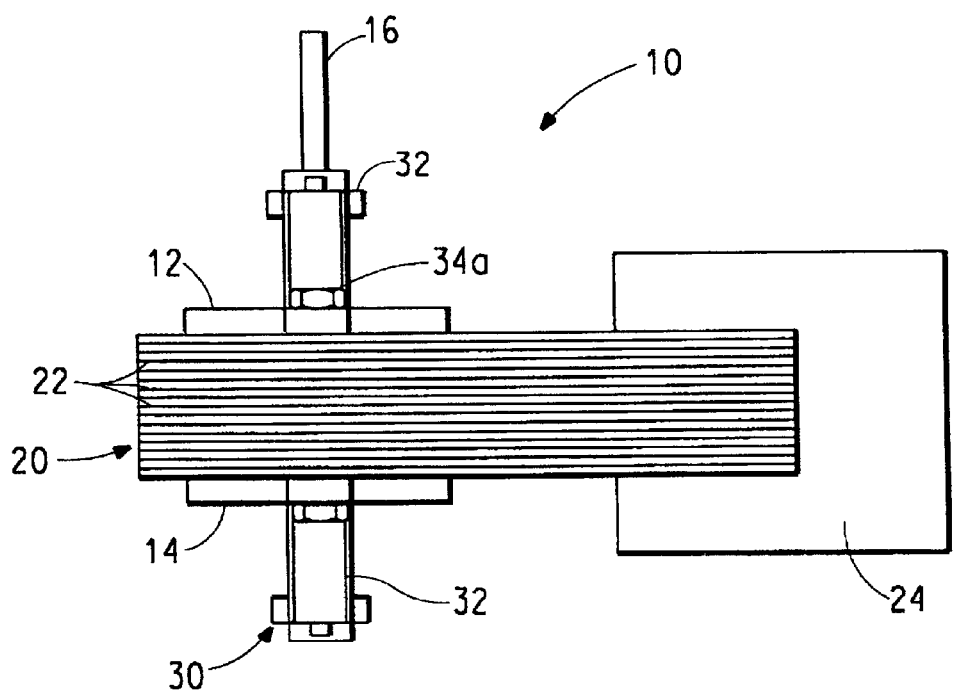
FIG. 2 is a side elevation of the motor of FIG. 1.

FIGS. 1 and 2 illustrate an electric motor 10 embodying one preferred embodiment of the invention. The motor 10 shown is a fractional horsepower "shaded pole" type motor such as that used to provide air circulation in a refrigeration system. The motor 10 comprises a rotor 12 comprising a rotor body 14 bearing a shaft 16 in rotationally fixed relation to the body 14. The rotor body 14 is rotationally disposed within an opening in a magnetic stator assembly 20 formed from a stack of aligned annular stator laminations 22. Electric field windings 24 wound around a portion of the stator 20 magnetize the stator laminations 22 to provide the required magnetic motive force for driving the rotor 12.

Figure 3:
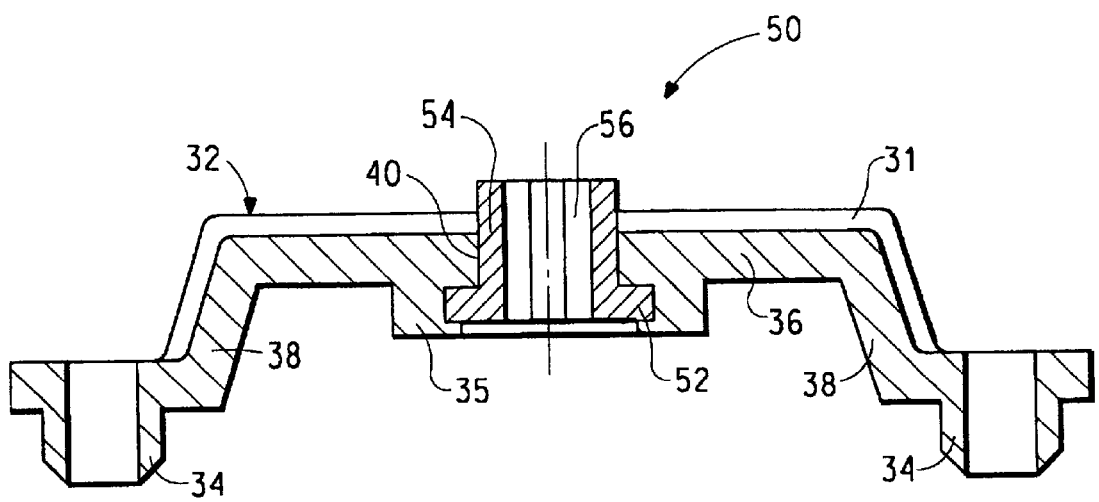
FIG. 3 is a cross-sectional elevation of a bearing system according to the invention.
Figure 4:
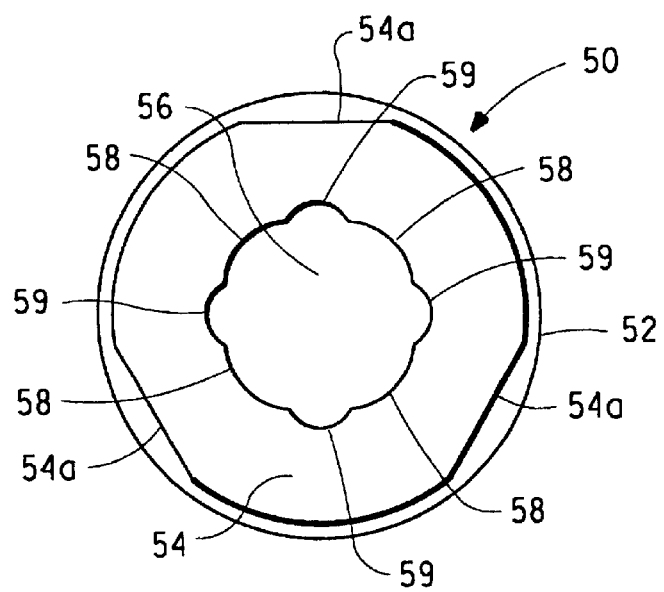
FIG. 4 is a plan view of the bearing in the system of FIG. 3.
Figure 5:
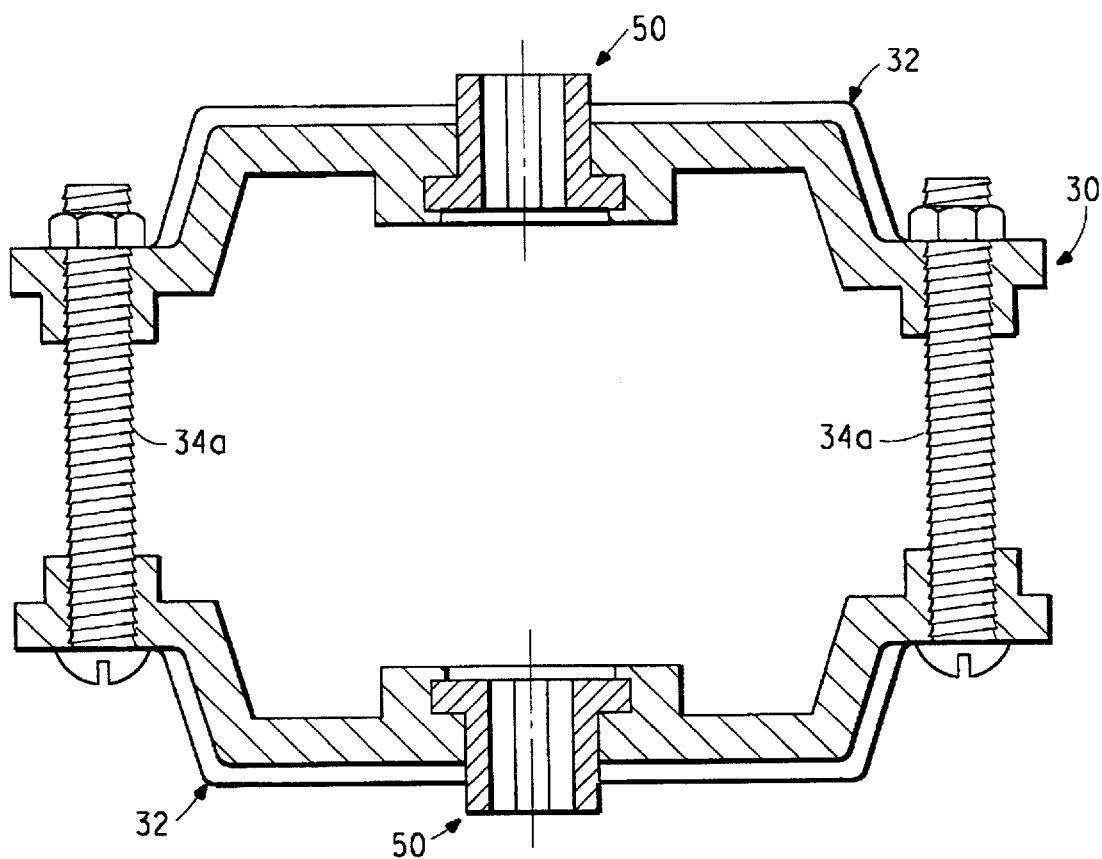
FIG. 5 is a cross-sectional elevation of a housing utilizing the brackets of FIG. 2, FIGS. 6, 6a and 6b are cross-sections of a further embodiment of a bearing bracket according to the invention.

According to the invention, the rotor shaft 16 is supported by a bearing system, a preferred embodiment of which is illustrated in FIGS. 3 to 5. A housing 30 comprises opposed bearing brackets 32 which extend radially across the ends of the rotor opening and are affixed to the stator 20, for example by bolts 34a. The bearing brackets 32 each support bearings 50 through which the rotor shaft 16 extends to stabilize and maintain proper alignment of the rotor 12 while allowing substantially free rotation of the rotor shaft 16 within the housing 30. It will be understood that the bearing system may comprise one bearing bracket 32, however, in the preferred embodiment, there are two such bearing brackets 32.

A preferred embodiment of the bearing is illustrated in FIG. 5. The bearing 50 is a flanged bearing, however the invention may be implemented using other types of bearings, including both plastic and metal bearings. The bearing 50 illustrated comprises a flange 52 extending radially from a hub 54. An opening 56 disposed axially through the bearing 50 is provided with one or more bearing surfaces 58 which contact the rotor shaft 16. In the embodiment shown the bearing opening is "fluted", comprising a plurality of truncated bearing surfaces 58 evenly distributed about the opening 56 and spaced apart by lobes 59 which are spaced from the rotor shaft 16. This minimizes the area of contact between the bearing 50 and the shaft 16 to reduce the degree of friction between the rotor shaft 16 and the bearing 50, and thus reduce the heat generated during operation. The lobes 59 also provide a channel or pocket for the accumulation of debris during operation of the motor 10.

In the preferred embodiment the bearings 50 are molded from a high performance polymeric plastic. One preferred bearing material is VESPEL® (Trademark) SP-2624 grade manufactured by DuPont (Trademark), due to its superior wear characteristics and extremely low coefficient of thermal expansion properties. Other bearings could be used in the system of the invention with suitable lubrication. Use of the VESPEL® (Trademark) SP-2624 polymer is advantageous because it can be manufactured to very close tolerances (as low as 0.0005 inches for small diameters) with no machining required, thereby minimizing manufacturing costs.

A first preferred embodiment of a bracket 32 for the bearing system of the invention is illustrated in detail in FIG. 3. Feet 34 are each provided with a hole through which bolt 34a is disposed to anchor the bracket 32 to the stator 20. A bridge 36 is maintained spaced from the stator 20 by risers 38, which may be oriented obliquely relative to the bridge 36.

According to the invention, the bracket 32 is flexible and thus able to deflect sufficiently to allow the bearing 50 to self align along the axis of the rotor shaft 16 both during assembly of the housing 30 to the motor 10 and during use of the motor 10. In the preferred embodiment the bearing bracket 32 is integrally molded from an elastomer, the preferred material being HYTREL® 5526 (Trademark) manufactured by DuPont (Trademark). HYTREL® 5526 has a flexural modulus of approximately 30 kPSI (according to ASTM specification no. D790) at ambient temperatures around 73 degrees Fahrenheit and 40 kPSI at 32 degrees Fahrenheit, which is typical for the interior of a domestic refrigeration unit, to produce a geometrically simple bracket 32 having a flexibility within the range suitable for a fractional-horsepower motor 10.

Other elastomers may also be suitable, however care must be taken to ensure that the bracket 32 exhibits appropriate flexibility characteristics. If the bracket 32 is too flexible the rotor 12 could contact the stator 20 when the motor is jarred or experiences unusual resistance; if the bracket 32 is too rigid the bearing 50 will not self align with the rotor shaft 16, which can result in accelerated and uneven wear on the bearing 50 and excessive noise when the motor 10 is in use.

The flexibility of the bracket 32 is determined by a combination of its geometric modulus, which is a function of the thickness and configuration of the bracket 32, and its flexural modulus, which is an inherent characteristic of the material used to form the bracket 32. According to the invention the bracket 32 is sufficiently flexible to allow the bearing to deflect into aligrunent with the rotor centerline, but sufficiently rigid that the rotor 12 cannot contact the stator 20 if the motor 10 is jarred or jostled under ordinary operating conditions. In addition, the damping characteristics of the bracket's 32 material allows for the rapid attenuation of induced vibration.

The external factors which affect the degree of deflection of the bracket 32 include the magnetic force of the motor 10, the mass of the rotor 12 and the size of the air gap between the rotor 12 and the stator 20. Thus, the flexibility of the bracket 32 for a particular motor 10 should be selected such that, under normal operating conditions, the bracket 32 will flex sufficiently to allow the bearing 50 to move into alignment with the axis of the rotor 12 but will not deflect to the point that the rotor 12 will contact the stator 20 upon the application of a radial percussive force which might be experienced during normal operation of the motor 10. Material selection and geometric design of the bracket 32 are interrelated and may be designed to exhibit the desired flexibility by selection of suitable thicknesses for the bridge 36 and risers 38, and optionally reinforcing structures such as ribs or ridges 31 as shown in the preferred embodiments.

Thus, the bearing bracket 32 itself flexes to compensate for slight misalignment between the rotor shaft 16 and the opening 56 in the bearing 50. It will be appreciated that the flexibility of the bracket 32 required to achieve the described parameters is measured at the receptacle 40 (i.e. the position of the bearing 50); thus, hybrid brackets 32 formed from a combination of rigid and flexible materials are also possible according to the invention.

In the preferred embodiment the bracket 32 is insert molded about the bearing 50 such that the bearing receptacle 40 is formed in the bridge 36, preferably centrally, during the molding process. This combines manufacture and assembly of the bearing system in a single step, and provides the advantage that the bearing 50 is largely encapsulated by the bracket 32 and therefore will not shift axially relative to the bracket 32. Use of a flanged bearing 50 augments captivation of the bearing 50 within the receptacle 40, and overmolding to produce a lip 35 about the outer surface of the flange 52 will ensure that the bearing 50 does not shift axially within the receptacle 40 or fall out during assembly of the housing 30 to the motor 10. Because of the high coefficient of friction of elastomeric materials the bearing 50 should be positioned within the receptacle 40 so that it projects above the top surface of the bracket 32, the hub 54 thereby providing a bearing surface for the thrust load (which may for example comprise an impeller).

Insert molding is also a preferred method of fabricating the bearing system because the resulting tolerances between the bearing 50 and the receptacle 40 are extremely small, and the bearing 50 is engaged to the bracket without any distortion or constriction of the opening 56. However, because of the low frictional resistance between the bearing 50 and the receptacle, and the constant torque applied to the bearing 50 when in use, a rotation lock is preferably provided to restrain the bearing 50 against rotation within the receptacle 40.

In the preferred embodiment the rotation lock comprises flats 54a disposed about the outer surface of the hub 54, best seen in FIG. 4. Insert molding the bracket 32 about the bearing 50 produces complimentary flats 40a distributed about the bearing receptacle 40, which cooperate with the flats 54a to restrain the bearing 50 against rotation. The rotation lock may in alternate embodiments comprise tabs or grooves (not shown) in the hub 54 or the flange 52, and complimentary mating structures (not shown) will be formed into the bearing receptacle 40 during the insert molding process.

Insert molding of the bracket/bearing assembly may result in the bearings 50 being slightly off of the axis or centerline of the rotor 12, however because of the flexibility of the brackets 32 the bearings 50 will self align with the axis of the rotor 12 during assembly as long as the assembled housing 30 supports the bearings 50 in the vicinity of the rotor shaft 16.

In use, the bearing 50 is mounted to the bearing bracket 32 by fitting the hub 54 into a mold (not shown) so that the flange 52 extends into the region of the bracket 32 that will form the receptacle 40. An elastomer such as HYTREL® (Trademark) or another suitable flexible material is injected into the mold, and as the mold is filled the bearing 50 is encapsulated by the elastomer. When the elastomer cures the bracket/bearing assembly is removed from the mold.

To assemble the motor 10, the rotor 12 is positioned within the opening in the stator 12, and the bearing brackets 32 are assembled to the stator 20 by disposing the rotor shaft 16 through the bearings 50, aligning the feet 34 with holes (not shown) through the stator laminations 22 and securing the housing 30 to the stator 20 as by bolts 34a. The motor 10 is mounted to an appliance in conventional fashion, and terminals 11 are connected to the local power supply.

In operation, as the rotor 12 rotates within the stator 20 the rotor shaft 16 rotates against the bearing surfaces 58. In the preferred embodiment no lubrication is required due to the extremely low frictional resistance and coefficient of thermal expansion of the high performance polymer used for the bearing 50. Because of the flexibility of the bearing bracket 32 the bearing 50 will deflect to accommodate deviations in the axial pitch of the rotor 12, thereby maintaining proper alignment between the bearing 50 and the rotor shaft 16 after assembly and during operation of the motor 10. The use of plastics for both the bearing bracket 32 and the bearing 50 reduces opportunities wearing of the bearing system components, and also reduces noise and vibration levels.

Figure 6:
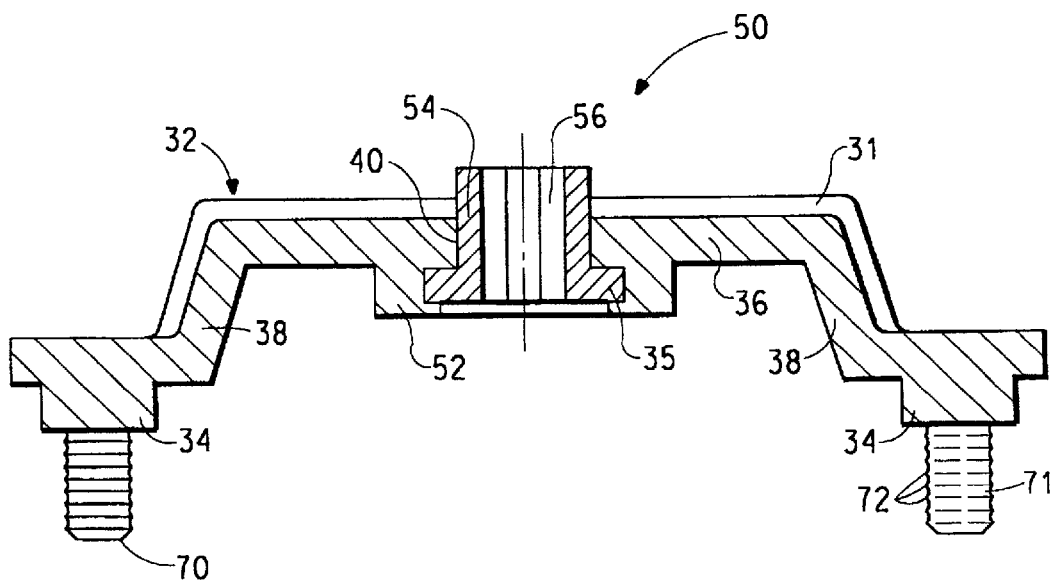
Figure 6A:
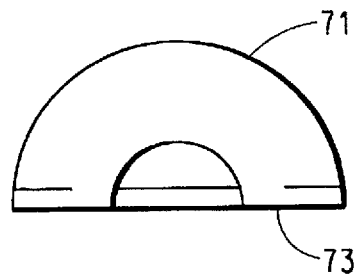
Figure 6B:
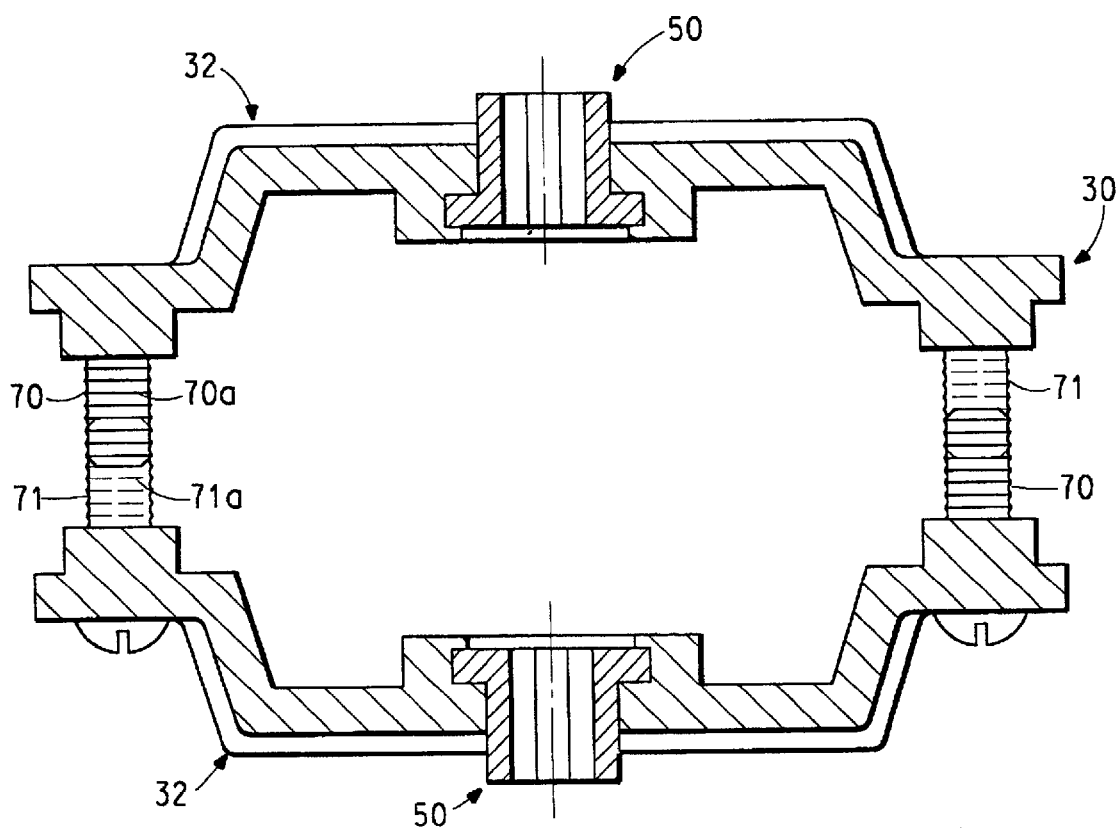

In a further embodiment of the invention, illustrated in FIGS. 6, 6a and 6b, the bracket 32 is provided with ribbed posts 70 and 71 projecting from the feet 34, preferably formed integrally with the bracket 32 during molding. Both posts 70 and 71 have a semi-circular configuration in cross-section. An example of this is shown in FIG. 6a where post 71 is illustrated as having a flat face 73. Post 70 has saw-tooth shaped ribs 70a whereas post 71 has saw-tooth shaped ribs 71a. The direction of the saw-tooth ribs 70a is opposite the direction of ribs 71a to allow for interlocking with a complimentary post as shown in FIG. 6b. When two brackets 32 of FIG. 6 are used as shown in FIG. 6b, the ribs 70a interlock with ribs 71a on the along faces 73 of posts 70 and 71 respectively. With this configuration, the posts 70 and 71 are self-orienting.

Figure 7:
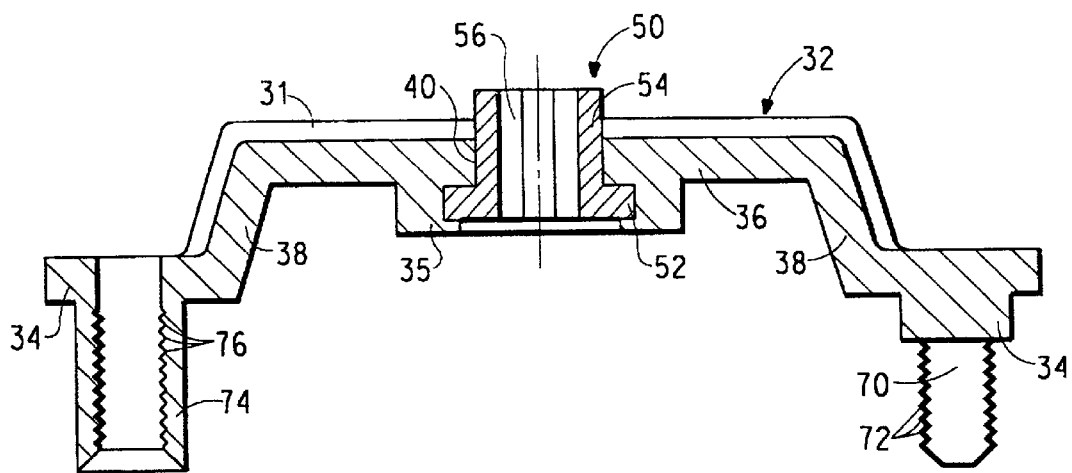
FIG. 7 is a cross-section of a still further embodiment of a bearing bracket according to the invention.
Figure 8:
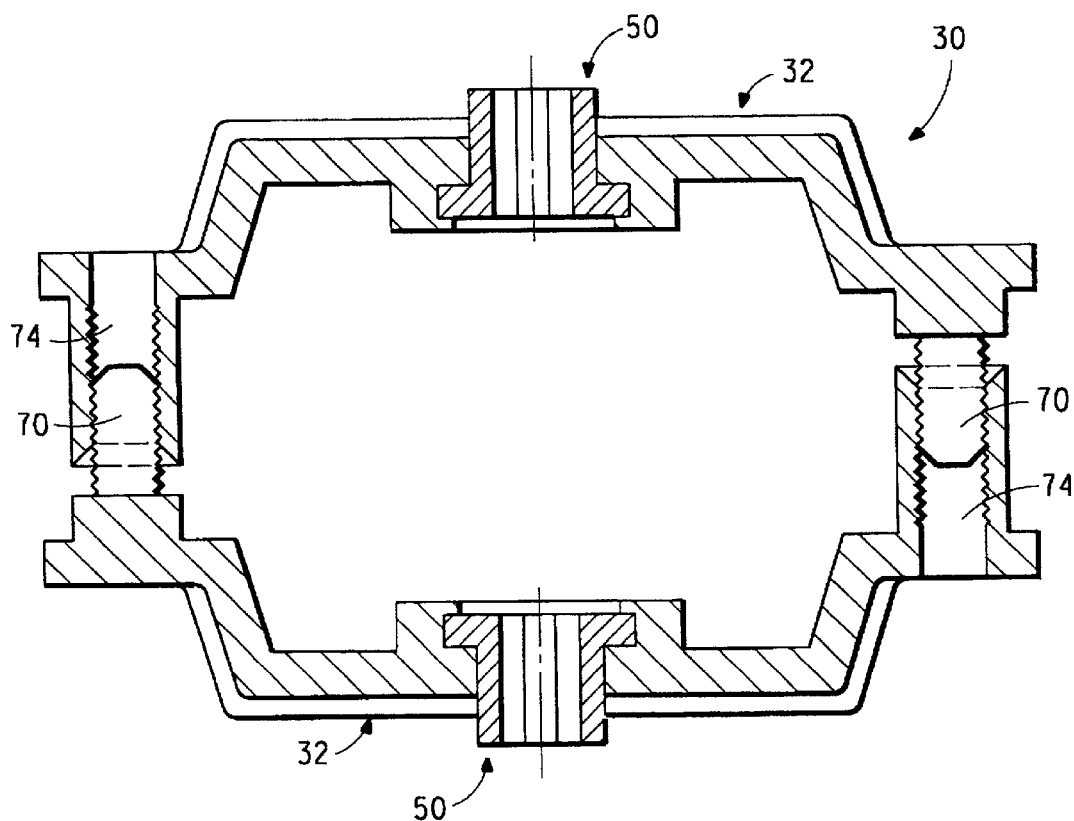
FIG. 8 is a cross-sectional elevation of a housing utilizing the brackets of FIG. 7.

A further embodiment is illustrated in FIG. 7, in which each bracket 32 may be provided with one post 70 and one socket 74. This simplifies manufacturing and reduces the number of parts to be maintained in inventory, since in this embodiment both brackets 32 are identical. However, the orientation of the brackets 32 must be taken into account during assembly of the housing 30 to a motor 10, to ensure that each post 70 aligns with a socket 74 on the opposite bracket 32. These embodiments allow two brackets 32 to be securely joined together to form the housing 30 without the need for bolts, screws or other securing means.

These embodiments are assembled to the stator 20 in the same fashion as the embodiment of FIG. 3, however instead of using bolts 34a the posts 70 are press-fitted into corresponding sockets 74. The opposed sawtooth configurations of the ribs 72, 76 provides a positive interlocking engagement between the posts 70 and the sockets 74, to thereby retain the brackets 32 securely affixed to the motor 10 as a unitary housing 30.

Preferred embodiments of the invention having been thus described by way of example, it will be apparent to those skilled in the art that modifications and adaptations may be made without departing from the scope of the invention, as set out in the appended claims.

What is claimed is:

1. A bearing system for use with a motor having a rotor shaft and a rotor rotating within an opening through a stator, comprising a bearing bracket comprising a receptacle surrounding a bearing and supporting the bearing in fixed relation to the bracket, wherein the bracket is adapted to be mounted on the motor such that the opening in the bearing is disposed in the vicinity of an axis of the rotor shaft, and wherein the bracket is sufficiently flexible that the rotor shaft can deflect the bracket so that the bearing moves into alignment with an axis of the rotating shaft but the bracket is sufficiently rigid that the rotor is maintained in spaced relation from the stator during operation of the motor and wherein the bracket is provided with two posts and adapted to interlock with complimentary posts on a second bracket.

2. A motor having a rotor shaft and a rotor rotating within an opening through a stator, having a bearing system comprising one or more bearings each comprising an opening having at least one bearing surface, for maintaining a radial alignment of the rotor shaft, and one or more bearing brackets each comprising a receptacle surrounding the bearing and supporting the bearing in fixed relation, wherein the brackets are adapted to be mounted on the motor such that the openings in the bearings are disposed on opposite ends of the stator in the vicinity of an axis of the rotor shaft, and wherein the brackets, at least a portion of said brackets, are sufficiently flexible that the rotor shaft can deflect the brackets so that the bearings move into alignment with an axis of the rotating shaft but the brackets are sufficiently rigid that the rotor is maintained in spaced relation from the stator during operation of the motor a first bracket is provided with at least one ribbed post and a second bracket is provided with at least one ribbed socket complimentary to the post, the post being adapted to be secured in the socket by interlocking between ribs of the post and ribs of the socket.

3. A motor having a rotor shaft and a rotor rotating within an opening through a stator, having a bearing system comprising one or more bearings each comprising an opening having at least one bearing surface, for maintaining a radial alignment of the rotor shaft, and one or more bearing brackets each comprising a receptacle surrounding the bearing and supporting the bearing in fixed relation, wherein the brackets are adapted to be mounted on be motor such that the openings in the bearings are disposed on opposite ends of the stator in the vicinity of an axis of the rotor shaft, and wherein the brackets are sufficiently flexible that the rotor shaft can deflect the brackets so that the bearings move into alignment with an axis of the rotating shaft but the brackets are sufficiently rigid that the rotor is maintained in spaced relation from the stator during operation of the motor in which each bracket is provided with two posts and adapted to interlock with complimentary posts on a second bracket.

* * * * *